(12) United States Patent
Aoyama et al.

(10) Patent No.: US 11,965,072 B2
(45) Date of Patent: Apr. 23, 2024

(54) SEMIAROMATIC POLYAMIDE FILM AND LAMINATE OBTAINED THEREFROM

(71) Applicant: UNITIKA LTD., Osaka (JP)

(72) Inventors: Yuki Aoyama, Kyoto (JP); Takashi Okabe, Kyoto (JP); Shuhei Yamane, Kyoto (JP); Tomoko Yamanaka, Kyoto (JP)

(73) Assignee: UNITIKA LTD., Osaka (JP)

( * ) Notice: Subject to any disclaimer, the term of this patent is extended or adjusted under 35 U.S.C. 154(b) by 0 days.

(21) Appl. No.: 18/015,180

(22) PCT Filed: Mar. 25, 2022

(86) PCT No.: PCT/JP2022/014406
§ 371 (c)(1),
(2) Date: Jan. 9, 2023

(87) PCT Pub. No.: WO2022/210357
PCT Pub. Date: Oct. 6, 2022

(65) Prior Publication Data
US 2023/0312847 A1    Oct. 5, 2023

(30) Foreign Application Priority Data

Mar. 31, 2021  (JP) .................... 2021-061182
Dec. 22, 2021  (JP) .................... 2021-208336

(51) Int. Cl.
| | |
|---|---|
| C08J 5/18 | (2006.01) |
| B29C 55/12 | (2006.01) |
| B29C 71/02 | (2006.01) |
| B32B 15/088 | (2006.01) |
| B32B 17/10 | (2006.01) |
| B32B 27/34 | (2006.01) |

(52) U.S. Cl.
CPC ............ *C08J 5/18* (2013.01); *B29C 55/12* (2013.01); *B29C 71/02* (2013.01); *B32B 15/088* (2013.01); *B32B 17/10724* (2013.01); *B32B 27/34* (2013.01); *B32B 2250/02* (2013.01); *B32B 2307/558* (2013.01); *B32B 2307/734* (2013.01); *B32B 2457/20* (2013.01); *C08J 2377/10* (2013.01)

(58) Field of Classification Search
CPC ......... C08J 5/18; C08J 2377/10; B29C 55/12; B29C 71/02; B32B 15/088; B32B 17/10724; B32B 27/34; B32B 2250/02; B32B 2307/558; B32B 2307/734; B32B 2457/20
See application file for complete search history.

(56) References Cited

U.S. PATENT DOCUMENTS

| | | | |
|---|---|---|---|
| 2012/0024577 A1 | 2/2012 | Stroeks et al. | |
| 2014/0083624 A1* | 3/2014 | Harris | C08G 69/32 |
| | | | 156/701 |
| 2022/0220256 A1 | 7/2022 | Okabe et al. | |

FOREIGN PATENT DOCUMENTS

| | | | |
|---|---|---|---|
| EP | 2641931 A1 | 9/2013 | |
| EP | 3970949 A1 | 3/2022 | |
| JP | 05131539 A * | 5/1993 | |
| JP | 10-235730 | 9/1998 | |
| JP | 2009-79210 | 4/2009 | |
| JP | 2012-82392 | 4/2012 | |
| JP | 2012-515244 | 7/2012 | |
| JP | 2013-189495 | 9/2013 | |
| JP | 2017-039847 | 2/2017 | |
| JP | 2020-132744 | 8/2020 | |
| JP | 2021-103757 | 7/2021 | |
| JP | 2021-127196 | 9/2021 | |
| KR | 10-2018-0127376 | 11/2018 | |
| WO | 2015/147121 | 10/2015 | |
| WO | 2017/164129 | 9/2017 | |
| WO | 2019054426 A1 | 3/2019 | |
| WO | WO-2020170919 A1 * | 8/2020 | |
| WO | WO-2020203389 A1 * | 10/2020 | |
| WO | 2020/230806 | 11/2020 | |

OTHER PUBLICATIONS

ISR in PCT/JP2022/014406 dated May 17, 2022.
English machine translation of JP2017-039847.
English machine translation of JP2020-132744.
English machine translation of JP2013-189495.
English machine translation of JP2009-79210.
English machine translation of JP2012-82392.
English machine translation of WO2015/147121.
English machine translation of JP10-235730.
English machine translation of JP2021-103757.
English machine translation of JP2021-127196.
Korean Office Action dated Mar. 13, 2023 in corresponding Korean Patent Agplication No. 10-2022-7041834 and English translation.
English machine translation of KR10-2018-0127376 and corresponding WO2017/164129.
Extended European Search Report for European Application No. 22780570.2 dated Feb. 2, 2024 (14 pp.).
Database WPI, Week 201925, Mar. 21, 2019, Thomson Scientific, London, GB, XP002810878 (3 pp.).
Database WPI, Week 2020073, Aug. 31, 2020, Thomson Scientific, London, GB, XP002810879 (2 pp.).

\* cited by examiner

*Primary Examiner* — John D Freeman
(74) *Attorney, Agent, or Firm* — DLA PIPER LLP (US)

(57) ABSTRACT

Provided is a semiaromatic polyamide fil having an average linear expansion coefficient in the width direction, measured under conditions of 20 to 125° C., of −90 to 0 ppm/° C.

9 Claims, No Drawings

SEMIAROMATIC POLYAMIDE FILM AND LAMINATE OBTAINED THEREFROM

TECHNICAL FIELD

The present invention relates to a semiaromatic polyamide film and a laminate obtained therefrom.

BACKGROUND ART

In recent years, electronic devices such as organic EL display devices, solar cells, and thin-film secondary batteries have become thinner and lighter. Both circuit substrates and display materials used in these electronic devices are required to be thin, and along with the thinning, demands for durability against external stress, such as flexibility, are increasing.

Patent Literature 1 discloses a polyamide film whose dimensional accuracy is improved when used as a circuit board by reducing the average linear expansion coefficient.

Patent literature 2 discloses a semiaromatic polyamide film having a small average linear expansion coefficient over a wide temperature range including the reflow soldering temperature range and controlled to a specific refractive index.

Patent Literature 3 discloses a semiaromatic polyamide film having a reduced heat shrinkage in the longitudinal direction and an improved tensile elongation at break in the width direction.

CITATION LIST

PATENT LITERATURES

Patent Literature 1: National Publication of International Patent Application No. 2012-515244
Patent Literature 2: Japanese Patent Laid-Open No. 2017-39847
Patent Literature 3: International Publication No. 2020/230806

SUMMARY OF INVENTION

TECHNICAL PROBLEM

However, although the polyamide film described in Patent Literature 1 has improved heat resistance and dimensional stability at high temperatures, its suitability as a laminate is not necessarily sufficient. For example, when a laminate obtained by laminating a semiaromatic polyamide film and a glass plate is used as a display component, wrinkles and sagging occur on the bonded surface, resulting in warpage and distortion of the display component, unfortunately.

The semiaromatic polyamide film described in Patent Literature 2 has a small average linear expansion coefficient and is controlled to a specific refractive index, thereby enhancing suitability as a substrate film or coverlay film for flexible printed circuits (FPC). However, the impact resistance and the appearance such as warpage, are sometimes insufficient in a laminate with a glass plate.

Although the semiaromatic polyamide film described in Patent Literature 3 has a sufficiently reduced heat shrinkage in the longitudinal direction and a sufficiently improved tensile elongation at break in the width direction, the impact resistance is insufficient in a laminate with a glass plate in some cases.

It is an object of the present invention to provide a semiaromatic polyamide film capable of improving the impact resistance and reducing the appearance defects such as warpage in a laminate bonded with a glass plate, and reducing the appearance defects such as warpage and distortion in a laminate bonded with a metal.

SOLUTION TO PROBLEM

As a result of diligent studies in order to achieve the aforementioned object, the inventors have found that the aforementioned object can be achieved by using a semiaromatic polyamide film that satisfies specific properties, thereby accomplishing the present invention.

A semiaromatic polyamide film of the present invention has an average linear expansion coefficient in a width direction, measured under conditions of 20 to 125° C., of −90 to 0 ppm/° C.

The semiaromatic polyamide film of the present invention preferably has an average linear expansion coefficient in a width direction, measured under conditions of 20 to 250° C., of −100 to 0 ppm/° C.

The semiaromatic polyamide film of the present invention preferably has a moisture absorption elongation in a width direction after 48 hours under conditions of 20° C. and 90% RH of 1.0% or less.

The semiaromatic polyamide film of the present invention preferably has a haze of 10% or less.

A laminate of the present invention includes the aforementioned semiaromatic polyamide film and a glass plate.

The laminate of the present invention preferably has a falling ball (66.8 g) drop distance upon rupture of the glass plate in a DuPont impact test, of 500 mm or more.

The laminate of the present invention includes the aforementioned semiaromatic polyamide film and a metal plate.

An image display device of the present invention uses the aforementioned laminate.

A method of producing a semiaromatic polyamide film of the present invention that is a method of producing the aforementioned semiaromatic polyamide film includes: biaxially stretching an unstretched film of a semiaromatic polyamide, and then performing a heat setting treatment, wherein the heat setting treatment is performed in a heat setting zone that is divided into two or more regions in a film traveling direction and provided with a gradient in temperature in which the temperature increases in the film traveling direction.

ADVANTAGEOUS EFFECTS OF INVENTION

The present invention can provide a semiaromatic polyamide film capable of improving the impact resistance and reducing the appearance defects such as warpage in a laminate bonded with a glass plate. Further, the present invention can provide a semiaromatic polyamide film capable of reducing the appearance defects such as warpage and distortion in a laminate bonded with a metal.

Circuit boards and display materials using such laminates can be suitably used in applications such as mobile devices, which are particularly required to be thin and light.

DESCRIPTION OF EMBODIMENTS

Hereinafter, the present invention will be described in detail.

<Properties of semiaromatic polyamide film>
(Average linear expansion coefficient)

The semiaromatic polyamide film of the present invention is required to have an average linear expansion coefficient in the width direction, measured under conditions of 20 to 125° C., of −90 to 0 ppm/° C., preferably −70 to −10 ppm/° C., more preferably −60 to −10 ppm/° C., most preferably −40 to −20 ppm/° C.

General films for laminates are required to have a small average linear expansion coefficient for improving the dimensional stability. Meanwhile, the semiaromatic polyamide film of the present invention has a negative average linear expansion coefficient, that is, it is a shrinkable film.

Generally, in the field of electric and electronic parts, an adherend stacked on a glass plate is exposed to a temperature atmosphere of about 80 to 130° C. during drying in the bonding process. Since the semiaromatic polyamide film of the present invention has an average linear expansion coefficient, measured under conditions of 20 to 125° C., falling within a predetermined range, the laminate with a glass plate not only has reduced appearance defects such as warpage, but also tends to have improved impact resistance since the impact energy is mitigated even when the glass plate is impacted.

Semiaromatic polyamide is a material originally having toughness, and the film to be obtained has shrinkage stress due to the negative average linear expansion coefficient. Accordingly, in a laminate with a glass plate, the film having a negative average linear expansion coefficient can create a repulsive force against deformation of the glass plate. A film with a large shrinkage stress, that is, a film with a large negative average linear expansion coefficient improves the impact resistance of the laminate. Meanwhile, a film with a large absolute value of the average linear expansion coefficient means that the laminate is likely to warp or deform.

In the present invention, the average linear expansion coefficient in the width direction is regarded as important. Films are usually handled as film rolls, and since roll-to-roll processing is performed in lamination and the like, film expansion and shrinkage can be easily controlled by adjusting the mechanical tension between rolls. However, expansion and shrinkage are more difficult to control in the width direction of a film, as compared with the longitudinal direction, and in order to reduce the warpage and deformation of the laminate, the film is required to have a specific average linear expansion coefficient as specified in the present invention in the width direction. In the present invention, the average linear expansion coefficient of the film in the longitudinal direction is not specifically limited, but a film produced the later-described method would have properties in the longitudinal direction that are not significantly different from the properties in the width direction.

The semiaromatic polyamide film of the present invention preferably has an average linear expansion coefficient in the width direction, measured under conditions of 20 to 250° C., of −100 to 0 ppm, more preferably −90 to 0 ppm, further preferably −70 to 0 ppm. Generally, in the field of electrical and electronic parts, soldering is performed under a reflow (180 to 250° C.) environment. The semiaromatic polyamide film or the present invention has an average linear expansion coefficient, measured under conditions of 20 to 250° C., falling within the predetermined range, and therefore the laminate has reduced concerns about deformation such as curling and distortion and reduced concerns about lifting and delamination, for example, even when exposed to high temperature conditions such as reflow soldering.

(Moisture absorption elongation)

The semiaromatic polyamide film of the present invention preferably has a moisture absorption elongation in the width direction after 48 hours under conditions of 20° C. and 90% RH after pretreatment at 20° C. and 40% RH of 1.0% or less, more preferably 0.8% or less, further preferably 0.5% or less. Generally, laminate films are required to have dimensional stability and small moisture absorption elongation. In the present invention, the moisture absorption elongation in the width direction is regarded as important due to similar reasons as the average linear expansion coefficient described above.

(Haze)

The semiaromatic polyamide film of the present invention preferably has a haze, measured according to JIS K7136, of 10% or less, more preferably 8% or less. The semiaromatic polyamide film has excellent transparency of the film alone and excellent visibility when formed into a laminate by having a hare of 10% or less. Particularly when laminated with a glass plate, the haze of the semiaromatic polyamide film is preferably 5% or less, in view of the visibility.

(Thickness)

The thickness of the semiaromatic polyamide film of the present invention is not specifically limited, but is preferably 10 μm or more, more preferably 20 μm or more, further preferably 25 μm or more, and preferably 150 μm or less, more preferably 100 μm or less, further preferably 75 μm or less, in view of the transparency and strength.

<SEMIAROMATIC POLYAMIDE>

In the present invention, semiaromatic polyamide constituting the semiaromatic polyamide film is composed of dicarboxylic acid components and diamine components and may have aromatic components in dicarboxylic acid components or diamine components.

Examples of the aromatic dicarboxylic acid constituting dicarboxylic acid components include terephthalic acid (TPA), isophthalic acid, and. naphthalenedicarboxylic acid. Among them, terephthalic acid and naphthalenedicarboxylic acid are preferable. Examples of the naphthalenedicarboxylic acid include 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid.

The dicarboxylic acid components preferably contain 60 mol % or more of terephthalic acid, more preferably 70 mol % or more, further preferably 85 mol % or more. In the case of the content of the terephthalic acid of less than 60 mol %, the film to be obtained may have reduced heat resistance or reduced low water absorption properties.

The dicarboxylic acid components may contain dicarboxylic acids other than the aromatic dicarboxylic acid, as long as the effects of the present invention are not impaired. Examples of the other dicarboxylic acids include aliphatic dicarboxylic acids such as oxalic acid, malonic acid, succinic acid, glutaric acid, adipic acid, sebacic acid, dodecanedioic acid, tetradecanedioic acid, and octadecanedioic acid.

Examples of the aliphatic diamine constituting the diamine components include linear aliphatic diamines such as 1,4-butanediamine, 1,5-pentanediamine, 1,6-hexanediamine, 1,7-heptanediamine, 1,8-octanediamine, 1,9-nonanediamine (NDA), 1,10-decanediamine (DDA), 1,11-undecanediamine, and 1,12-dodecanediamine, and branched-chain aliphatic diamines such as 2-methyl-1,8-octanediamine (MODA), 4-methyl-1,8-octanediamine, 5-methyl-1,9-nonanediamine, 2,2,4-/2,4,4-trimethyl-1,6-hexanediamine, 2-methyl-1,5-pentanediamine, 2-methyl-1,6-hexanediamine, and 2-methyl-1,7-heptanediamine.

The diamine components preferably contain an aliphatic diamine having 6 to 12 carbon atoms, more preferably an aliphatic diamine having 9 to 12 carbon atoms, further preferably an aliphatic diamine having 9 or 10 carbon atoms, as a main component The content of the aliphatic diamine having 6 to 12 carbon atoms in the diamine components is preferably 60 mol % or more, more preferably 75 mol % or more, further preferably 90 mol % or more. When the content of the aliphatic diamine having 6 to 12 carbon atoms is 60 mol % or more, the film to be obtained can have both heat resistance and productivity. One of the aliphatic diamines having 6 to 12 carbon atoms may be used alone or may be used in combination of two or more. In the case of using two or more in combination, the content is the total thereof.

The diamine components may contain diamines other than the aliphatic diamines, as long as the effects of the present invention are not impaired. Examples of the other diamines include alicyclic diamines such as isophoronediamine, norbornanedimethylamine, and tricyclodecanedimethylamine, and aromatic diamines such as metaxylylenediamine, paraxylylenediamine, metaphenylenediamine, and paraphenylenediamine.

The semiaromatic polyamide may be copolymerized with lactams such as ε-caprolactam, ζ-enantholactam, η-capryllactam, and ω-laurolactam, as long as the effects of the present invention are not impaired.

The type of the monomers constituting the semiaromatic polyamide and the copolymerization ratio are preferably selected so that the melting point (Tm) of the semiaromatic polyamide to be obtained falls within the range of 270 to 350° C. The semiaromatic polyamide with a Tm falling within the aforementioned range can efficiently suppress thermal decomposition during processing into a film. When the Tm is less than 270° C., the film to be obtained may have insufficient heat resistance. Meanwhile, when the Tm is over 350° C., the semiaromatic polyamide may undergo thermal decomposition during film production.

The intrinsic viscosity of the semiaromatic polyamide is preferably 0.8 to 2.0 dL/g, more preferably 0.9 to 1.8 dL/g. The semiaromatic polyamide having an intrinsic viscosity of 0.8 dL/g or more can produce a film with excellent mechanical strength but may have difficulty in producing a film when it is over 2.0 dL/g.

The semiaromatic polyamide may contain a polymerization catalyst or an end-capping agent. Examples of the end-capping agent include acetic acid, lauric acid, benzoic acid, octylamine, cyclohexylamine, and aniline. Examples of the polymerization catalyst include phosphoric acid, phosphorous acid, hypophosphorous acid, or salts thereof.

In the present invention, the semiaromatic polyamide is preferably polyamide 6T (Tm: 320° C., Tg: 125° C.) consisting of 1,6-hexanediamine and TPA, polyamide 9T (Tm: 302° C., Tg: 125° C.) consisting of NDA and/or MODA and TPA, polyamide 10T (Tm: 316° C., Tg: 150° C.) consisting of DDA and TPA, or polyamide 9N consisting of NDA and/or MODA and naphthalenedicarboxylic acid, in view of the balance between the heat resistance and workability, and is particularly preferably polyamide 9T, in view of the ease of control of the average linear expansion coefficient and the moisture absorption elongation specified in the subject application. As an index of heat resistance, the melting point (Tm) and glass transition temperature (Tg) of each polyamide can be referred to.

<PRODUCTION OF SEMIAROMATIC POLYAMIDE FILM>

(Raw material)

The semiaromatic polyamide can be produced using a known method. Examples thereof include solution polymerization or interfacial polymerization using acid chloride and diamine components as raw materials (method A), a method of producing oligomers using dicarboxylic acid components and diamine components as raw materials and increasing the molecular weight of the oligomers by melt polymerization or solid-phase polymerization (method B), a method of producing a ground mixture of salts and oligomers using dicarboxylic acid components and diamine components as raw materials, followed by solid-phase polymerization (method C), and a method of producing salts using dicarboxylic acid components and diamine components as raw materials, followed by solid-phase polymerization (method D). Among them, method C and method D are preferable, and method D is more preferable. Compared to method B, method C and method D can produce a ground mixture of salts and oligomers or salts at a low temperature, and a large amount of water is not required when producing the ground mixture of a salt and oligomers or salts. Therefore, the generation of gel-like bodies can be reduced, and fish eyes can be reduced.

Commercially available products can be suitably used as the semiaromatic polyamide. Examples of such commercially available products include "GENESTAR (R)", available from KURARAY CO., LTD, "XecoT (R)", available from Unitika Ltd., "Reny (R)", available from Mitsubishi Engineering-Plastics Corporation, "ARLEN (R)", available from Mitsui Chemicals, Inc., and "Ultramid (R)", available from BASF SE.

The raw materials of the semiaromatic polyamide film to be used may those using only virgin raw materials, non-standard films generated during the production of semiaromatic polyamide films, scrap mixtures generated as edge trims, and virgin raw materials added to the scrap mixture. The raw materials can be mixed by a known method such as a method of dry blending using a known device, a kneading method of melt kneading using a uniaxial or biaxial extruder for mixing.

(Additive)

The semiaromatic polyamide film of the present invention may contain additives such as lubricants, colorants such aa pigments and dyes including titanium, color inhibitors, heat stabilizers, antioxidants such as hindered phenol, phosphate ester, and phosphite ester, weather resistance improvers such as benzotriazole compounds, bromine or phosphorus flame retardants, plasticizers, mold release agents, enhancers such as talc, modifiers, antistatic agents, ultraviolet absorbers, antifogging agents, and various polymer resins, as required, as long as various properties as a film are not impaired.

Examples of lubricants for improving the slip properties can include inorganic particles such as silica, alumina, titanium dioxide, calcium carbonate, kaolin, and barium sulfate. Further, examples of organic fine particles can include acrylic resin particles, melamine resin particles, silicone resin particles, and crosslinked polystyrene particles. The average particle size of such a lubricant is preferably 0.05 to 5.0 μm. The content of the lubricant is preferably 0.3 mass % or less. The average particle size and the content of the lubricant can be selected depending on the required properties of the film such as friction properties, optical properties, etc.

Examples of the method of adding such an additive to the semiaromatic polyamide film can include the following methods:
(i) Method of adding the additive during polymerization of the semiaromatic polyamide;
(ii) Masterbatch method of preparing pellets obtained by melt-kneading the additive at high concentration with the semiaromatic polyamide;
(iii) Method of directly adding the additive to the semiaromatic polyamide during film production, followed by melt kneading with an extruder; and
(iv) Method of directly adding the additive to an extruder during film production, followed by melt kneading.

(Extrusion)

In the production of the semiaromatic polyamide film of the present invention, an unstretched film of the semiaromatic polyamide to be used in the biaxial stretching process can be produced by melt-mixing the semiaromatic polyamide in an extruder at a temperature of 280 to 340° C. for 3 to 15 minutes, then extruding it through a T die into a sheet, and cooling the sheet product in close contact with cooling rolls adjusted to have a temperature of 30 to 40° C.

(Stretching)

The semiaromatic polyamide film of the present invention is obtained by biaxially stretching an unstretched film. The semiaromatic polyamide is oriented and crystallized by stretching.

The stretching method is not specifically limited, but flat sequential biaxial stretching, flat simultaneous biaxial stretching, a tubular method, or the like can be used. Among these, flat sequential biaxial stretching and flat simultaneous biaxial stretching are most preferable, since a film with good thickness accuracy can be obtained.

Examples of the stretching device for adopting flat simultaneous biaxial stretching include a screw tenter, a pantograph tenter, and a linear motor-driven clip tenter.

The stretch ratio is preferably 1.5 to 3.5 times in the longitudinal direction (MD) and 1.5 to 4.5 times in the width direction (TD), more preferably 1.5 to 3.0 times in the longitudinal direction and 1.5 to 3.5 times in the width direction.

In the case of sequential biaxial stretching, when the stretch ratio in the longitudinal direction is over 3.5 times, the stretched film to be obtained may have reduced stretchability in the width direction due to excessive progress of crystallization. Also, in the case of stretching in the width direction being possible, the stretched film to be obtained may have reduced tensile elongation at break in the longitudinal direction and reduced transparency.

In the case of simultaneous biaxial stretching, when the stretch ratio in the longitudinal direction is over 3.5 times, the stretched film to be obtained may have reduced dimensional stability due to high heat shrinkage.

Meanwhile, when the stretch ratio in the width direction is over 4.5 times, the stretched film to be obtained has high heat shrinkage and reduced dimensional stability, which may result in further reduction in tensile elongation at break.

When the stretch ratio in the longitudinal direction and in the width direction is less than 1.5 times, the stretched film to be obtained tends to have stretch marks and may have thickness unevenness and reduced flatness.

The stretching rate is not specifically limited, but the stretching strain rate both in the longitudinal direction and in the width direction is preferably 400% to 12000%/minute, in order to avoid film fracture.

The stretching temperature is preferably the Tg of the semiaromatic polyamide or more, more preferably over the Tg and equal to or less than (Tg+50° C.). When the stretching temperature is less than the Tg, the film easily fractures, and stable production is impossible, whereas when it is over (Tg+50° C.), the film may have stretch marks.

(Heat setting)

After the aforementioned stretching, the semiaromatic polyamide film is preferably subjected to heat setting while the film is gripped with clips used for stretching. The film to be obtained can have reduced heat shrinkage without thermal marks by heat setting.

The heat setting temperature is preferably 260 to 285° C., more preferably 265 to 280° C., further preferably 270 to 280° C. When the heat setting temperature is less than 260° C., the film to be obtained has high heat shrinkage. When the heat setting temperature is over 285° C., the film to be obtained has high moisture absorption elongation and reduced tensile elongation at break. Further, fracture occurs depending on the circumstances during heat setting, and it becomes difficult to obtain a biaxially stretched film.

In the present invention, it is necessary to subject the film to heat setting in a heat setting zone that is divided into two or more regions in the film traveling direction and provided with a gradient in temperature in which the temperature increases in the film traveling direction. The temperature gradient in the heat setting zone preferably increases by 3° C. or more in the film traveling direction, more preferably increases by 5° C. or more. When the heat setting zone is divided into two regions, the temperature of the first half is preferably 260 to 280° C., more preferably to 260 to 275° C. Further, the temperature of the latter half is preferably 265° C. to 285° C., more preferably 270 to 280° C. Heat setting in the heat setting zone provided with a gradient in temperature enables the semiaromatic polyamide film not only to easily have an average linear expansion coefficient falling in a specified range in the present invention but also to have an average linear expansion coefficient and a moisture absorption elongation falling within specified ranges in a balanced manner.

Heat setting is preferably performed for 1 to 60 seconds under the aforementioned temperature conditions, more preferably for 5 to 40 seconds, further preferably for 8 to 30 seconds. When the heat setting time is less than 1 second, the film to be obtained undergoes insufficient heat setting, whereas when it exceeds 60 seconds, the crystallization of the semiaromatic polyamide is accelerated, and it may become difficult for the film to be obtained to achieve the average linear expansion coefficient specified in the present invention.

The total of each heat setting time in the heat setting zone divided into two or more regions may fall within the aforementioned range, but the heat setting time is preferably 3 seconds or more in each part of the heat setting zone. The ratio of the heat setting time in each part of the heat setting zone depends on the zone length of the heat fixer and may be set so as to be about equal times.

Examples of the heat setting method include known methods such as a method of blowing hot air, an infrared irradiation method, and a microwave irradiation method. Among them, the method of blowing hot air is preferable because it enables uniform and accurate heating.

(Relaxation)

The film subjected to heat setting is preferably subjected to relaxation treatment at the same temperature as the final heat setting temperature in the heat setting process while being gripped with clips. The relaxation treatment is preferably performed at a relaxation rate of 1.0 to 8.0% in the longitudinal direction and at a relaxation rate of 1.0 to 12.0% in the width direction. When the relaxation rate in the longitudinal direction and in the width direction is less than 1.0%, it may be impossible to obtain a film with sufficiently reduced heat shrinkage. Further, when the relaxation rate in the longitudinal direction is over 8.0%, or the relaxation rate in the width direction is over 12.0%, the biaxially stretched film to be obtained may have high moisture absorption elongation in the longitudinal direction or in the width direction. Further, when the distance between the clips before stretching is increased so that the relaxation rate in the longitudinal direction is over 8.0%, the mechanical strength of the film to be obtained is susceptible to an increase in fluctuation between the clip griped and non-griped portions.

Relaxation treatment at a relaxation rate of 1.0 to 8.0% in the longitudinal direction and 1.0 to 12.0% in the width direction reduces the heat shrinkage, so that a film with an increased dimensional stability can be obtained. Also, setting the relaxation rate low reduces the moisture absorption elongation of the biaxially stretched film to be obtained.

In simultaneous biaxial stretching and sequential biaxial stretching, the aforementioned relaxation treatment can be performed simultaneously in the longitudinal direction and in the width direction inline.

(Annealing)

The semiaromatic polyamide film of the present invention may be annealed in order to remove the residual stress of the film. After the biaxially stretched film is relaxed inline in the width direction, the film is wound up once and is passed through a drying furnace set at a predetermined temperature at low tension off-line, so that it is relaxed also in the longitudinal direction.

In a device to produce the semiaromatic polyamide film of the present invention, the surfaces of the cylinder, the melting unit of the barrel, the measuring unit, the tube, the filter, the T-die, and the like are preferably treated to reduce the surface roughness in order to prevent the resin from stagnation. Examples of the method of decreasing the surface roughness include a modification method using substances with low polarity. Alternatively, examples thereof include a method of vapor-depositing silicon nitride or diamond-like carbon on the surface.

The semiaromatic polyamide film obtained may be in the form of a sheet or may be wound up on a take-up roll to form a film roll. In view of productivity when used for various applications, it is preferably in the form of a film roll. When formed into a film roll, it may be slit to a desired width.

The semiaromatic polyamide film may be a single-layer film consisting of one layer or a multilayer structure consisting of two or more layers laminated. In the case of a multilayer structure, any one of the two layers may contain a lubricant, for example, in a film with a two-layer structure, and each of the three layers on both surfaces may contain a lubricant in a film with a three-layer structure. The type and content of the lubricant to be contained can be designed independently. With such a multilayer structure, the surface roughness of each surface of the semiaromatic polyamide film can be independently controlled.

<LAMINATE>

The laminate of the present invention includes a semiaromatic polyamide film and a glass plate, or a semiaromatic polyamide film and a metal plate.

Other than the glass and metal plate, the semiaromatic polyamide film of the present invention may be laminated with inorganic substances such as metal oxides, other polymers, paper, woven fabrics, non-woven fabrics, woods, or the like.

The semiaromatic polyamide film of the present invention has excellent dimensional stability in addition to the inherent heat resistance of polyamide, so that it can be suitably used for various electric and electronic parts applications by laminating it with other substrates. In particular, lamination with transparent substrates such as glass plates and transparent polyimide for optical substrate applications, and lamination with metal materials such as copper foil and copper plates for circuit substrate applications enables a laminate with suppressed warpage and distortion to be formed.

Examples of the properties required for the substrate of the laminate include strength, dimensional stability, lamination adhesion, and the like, and the properties are determined depending on the application and purpose. For example, a laminate with a glass plate is required to have a strength to an extent that the glass plate is not damaged, and a laminate with a metal plate is required to have a dimensional stability to prevent warpage and wrinkles and an adhesion between the semiaromatic polyamide film and the metal plate.

(Glass plate)

Any appropriate glass plate is adopted for a laminate with the semiaromatic polyamide film and may be referred to as a glass film.

The thickness of the glass plate is preferably 10 µm or more, more preferably 30 µm or more, further preferably 50 µm or more. Meanwhile, the thickness of the glass plate is preferably 200 µm or less, more preferably 150 µm or less. When the thickness of the glass plate is 10 µm or more, an extreme reduction in mechanical strength can be prevented, whereas when it is 200 µm or less, handleability is excellent without lowering the production efficiency of the glass itself.

The composition of the glass plate is not specifically limited. Almost all glass compositions such as soda-lime glass, borosilicate glass, and alkali-free glass can be applied, for example, and those reinforced and subjected to secondary processing such as surface treatment are also applicable. Any material can be used properly depending on the application.

Examples of the secondary processing include various surface treatments including treatment with a coupling agent such as a silane coupling agent and a titanium coupling agent, chemical conversion treatment such as acid treatment, alkaline treatment, ozone treatment, and ion treatment, discharge treatment such as plasma treatment, glow discharge treatment, arc discharge treatment, and corona treatment, electromagnetic radiation treatment such as UV treatment, X-ray treatment, gamma treatment, and laser treatment, and surface treatment such as other flame treatment. In particular, for improving the adhesion with the later-described adhesive layer, it is preferably surface-treated with a silane coupling agent separately from the adhesive layer.

Specific examples of a commercially available glass plate (glass film) include product name "OA-10G" available from Nippon Electric Glass Co., Ltd., which is alkali-free glass.

(Metal plate)

The metal plate that is used for a laminate with the semiaromatic polyamide film is not specifically limited, and examples thereof include metal foils such as electrodeposited copper foils, rolled copper foils, aluminum foils, and stainless steel foils other than metal plates consisting of various metals. Among them, electrodeposited copper foils and rolled copper foils are preferable, in view of the conductivity and circuit workability.

The thickness of the metal plate depends on the application of the laminate and is therefore not specifically limited but is preferably 1 to 35 µm, more preferably 9 to 18 µm. When the thickness of the metal plate is less than 1 µm, circuit defects tend to occur due to pinholes and tears when producing circuit boards, whereas when the thickness is over 35 µm, the lamination temperature with the semiaromatic polyamide film increases, so that the productivity tends to decrease.

Further, the surface of the metal plate may be subjected to inorganic surface treatment with zinc plating, chromium plating, or the like, or organic surface treatment with a silane coupling agent, or the like.

Specific examples of commercially available copper foils include product name "Rolled Copper Foil BHY", available from JX Nippon Mining & Metals Corporation, and product name "Rolled Copper Foil ROFL", available from FUKUDA METAL FOIL & POWDER CO., LTD.

Laminates of the semiaromatic polyamide film with various substrates can be produced by bonding with known adhesives typified by OCA (Optical Clear Adhesive).

When producing laminates, an adhesive layer is provided on a surface where the semiaromatic polyamide film and each substrate are in contact, as required, for improving the adhesion between the semiaromatic polyamide film and various substrates.

Preferable examples of the adhesive layer include layers composed of heat-sensitive adhesives and pressure adhesives, preferably a heat sealing layer that exerts adhesion by heating and pressurizing, as required.

Examples of the resin constituting the adhesive layer can include at least one selected from acrylic resins, vinyl chloride resins, vinyl acetate resins, vinyl chloride-vinyl acetate copolymer resins, styrene-acrylic copolymer resins, polyester resins, and polyamide resins.

The thickness of the adhesive layer is preferably 30 µm or less, more preferably 0.1 to 20 µm, for obtaining excellent adhesiveness with the semiaromatic polyamide film. When providing the adhesive layer, OCR (Optical Clear Resin) and liquid coatings may be applied without departing from the gist of the present invention.

The method of bonding the semiaromatic polyamide film and the glass plate is not specifically limited. Examples thereof include a roll-to-roll method using laminator rolls and a batch method using a press machine, and the temperature conditions and pressure conditions are appropriately selected, as needed.

(Resin layer)

The semiaromatic polyamide film may be laminated with a resin layer according to the application. Examples of the method of providing a resin layer include a method of applying a coating agent for forming resin layers to a biaxially stretched semiaromatic polyamide film (off-line method) and a method of applying a coating agent for forming resin layers to a semiaromatic polyamide film before biaxial stretching, followed by stretching and heat treatment (inline method). Either method can be adopted. Further, a method of providing a resin layer by bonding a substrate provided with the resin layer with a semiaromatic polyamide film or a method of bonding a resin layer formed on a base film such as a mold release film with a semiaromatic polyamide film and delaminating the mold release film to transfer the resin layer can be adopted.

The inline method enables the coating agent for forming resin layers to be applied during the production process of the semiaromatic polyamide film while the degrees of orientation and crystallization on the surface of the semiaromatic polyamide film are low, so that the adhesion between the semiaromatic polyamide film and the resin layer is improved. In addition, since the resin layer can be heat-treated at a higher temperature while the semiaromatic polyamide film is under tension, the adhesion of the resin layer can be improved without degrading the quality of the semiaromatic polyamide film.

The heat treatment temperature can be 255° C. or more that is the heat setting temperature of the semiaromatic polyamide film, and the resin layer is oriented and crystallized at this temperature together with the semiaromatic polyamide film. Further, the resin and the crosslinking agent sufficiently react with each other in the resin layer formed, and the coating strength of the resin layer itself increases, so that the adhesion with the semiaromatic polyamide film is enhanced.

Further, the inline method in which the coating agent for forming resin layers is applied during the production process of the semiaromatic polyamide film not only can simplify the production process, as compared with off-line application, and is advantageous also in view of the cost by thinning the resin layer.

In the case of adopting simultaneous biaxial stretching in the production of the semiaromatic polyamide film, the coating agent for forming resin layers is applied to an unstretched film, followed by drying, and then the film is biaxially stretched at a temperature range of the Tg to 50° C. higher than Tg of the resin constituting the semiaromatic polyamide film in each of the longitudinal and width direction at a stretch ratio of about 2 to 4 times in the inline method. The film may be subjected to preliminary longitudinal stretching of about 1 to 1.2 times before being introduced to the simultaneous biaxial stretching machine.

Further, when adopting sequential biaxial stretching, the inline method is preferably performed by applying the coating agent for forming resin layers to a uniaxially stretching semiaromatic polyamide film, and then further stretching the semiaromatic polyamide film in a direction orthogonal to the direction, for convenience and operational reasons.

The method of applying the coating agent for forming resin layers to the semiaromatic polyamide film can be a known method. For example, gravure roll coating, reverse roll coating, wire bar coating, lip coating, air knife coating, curtain flow coating, spray coating, dip coating, and brush coating can be adopted. These methods allow the coating agent to be uniformly applied onto the surface of the semiaromatic polyamide film.

The drying heat treatment after applying the coating agent for forming resin layers to the semiaromatic polyamide film can remove an aqueous medium, so that a laminate with a resin layer consisting of a dense coating film in close contact with the semiaromatic polyamide film can be obtained.

The surface of the semiaromatic polyamide film may be subjected to corona treatment, plasma treatment, acid treatment, flame treatment, and the like, in order to improve adhesion to other materials.

(Applications of laminate)

The laminate using the semiaromatic polyamide film of the present invention can be used for electronic materials, optical parts, and other applications, and there is no particular limitation. Specifically, examples thereof include protective plates for solar cell substrates, liquid crystal plates, conductive films, and display devices; electronic substrate materials such as LED mounting substrates, substrates for flexible printed wiring, and flexible flat cables; and coverlays for flexible printed wiring. A laminate with glass has transparency equivalent to that of glass and improved strength compared to a glass plate, and is therefore useful as a glass layer in an image display device or the like. A laminate with a metal is excellent in heat resistance and metal adhesion, and is therefore useful as a base film for flexible substrates and the like. The laminate may be used alone or may be used in combination with another film or the like.

<IMAGE DISPLAY DEVICE>

The image display device of the present invention uses the aforementioned laminate. Specific examples of the image display device of the present invention include liquid crystal displays, organic EL (electroluminescence) displays, inorganic EL displays, electronic paper, and plasma display and microelectromechanical system (MEMS) displays, which are provided with the laminate of the present invention. Examples of the members constituting an image display device can include any one member selected from the group consisting of polarizing plates, liquid crystal display panels, organic EL (electroluminescence) panels, plasma display panels, touch panels, and protective panels. These applications are just examples, and the applications of the laminate of the present invention are not limited thereto.

EXAMPLES

Hereinafter, the present invention will be described specifically by way of examples, but the present invention is not limited to the following examples.

1. Evaluation method

The semiaromatic polyamide films or laminates obtained in Examples and Comparative Examples were measured and evaluated by the following methods.

(1) Intrinsic viscosity of semiaromatic polyamide

The intrinsic viscosity ($\eta_{inh}$) of the resin was determined by the following formula in concentrated sulfuric acid at 30° C. at each concentration of 0.05, 0.1, 0.2, and 0.4 g/dL. A value obtained by extrapolating this to a concentration of 0 was defined as the intrinsic viscosity [η].

$\eta_{inh}=[\ln(t_1/t_0)]/c$

In the formula, $\eta_{inh}$ represents the intrinsic viscosity (dL/g, $t_0$ represents the flow time of a solvent (second), $t_1$ represents the flow time of a resin solution (second), and c represents the resin concentration in a solution (g/dL).

(2) Thickness of semiaromatic polyamide film

The thickness was measured at 10 points or more using a digital display meter (type: ND287, available from HEIDENHAIN), and an average thereof was calculated.

(3) Haze of semiaromatic polyamide film

The semiaromatic polyamide film was cut out into a size of 50×100 mm, and it was attached to a jig, to measure the haze using a haze meter (type: NDH4000, available from NIPPON DENSHOKU INDUSTRIES CO., LTD.).

(4) Average linear expansion coefficient of semiaromatic polyamide film

Immediately after production, a semiaromatic polyamide film that was kept completely dried was cut into a size of 30 mm (in the width direction)×4 mm (in the longitudinal direction), followed by standing in an environment at 20° C. (completely dried) for 48 hours or more. Thereafter, the resultant was attached to a thermomechanical analyzer (type: TMA7100, available from Hitachi High-Tech Science Corporation), to measure the dimensional change in the width direction (test sample width: 4 mm, gauge length: 10 mm, and load: constant at 40 mN). The measurement conditions were the following conditions A and B. The case where the film dimension increases with the temperature increase (expand) is taken as positive (plus), and the case where the film dimension decreases (shrinks) with the temperature increase is taken as negative (minus).

<CONDITIONS A>

The temperature was increased from 20° C. up to 125° C. at 10° C./minute and maintained for 5 minutes. The average linear expansion coefficient A was calculated by the following formula from the dimensions measured at 125° C. and 20° C.

Average linear expansion coefficient A [ppm/°C.]= (dimension at 125° C.–dimension at 20° C.)/ (dimension at 20° C.)/(125° C.–20° C.)×10$^6$

<CONDITIONS>

The temperature was increased from 20° C. up to 250° C. at 10° C./minute and maintained for 5 minutes. The average linear expansion coefficient B was calculated by the following formula from the dimensions measured at 250° C. and 20° C.

Average linear expansion coefficient B [ppm/°C.]= (dimension at 250° C.–dimension at 20° C.)/ (dimension at 20° C.)/(250° C.–20° C.)×10$^6$ (5) Moisture absorption elongation of semiaromatic polyamide film A semiaromatic polyamide film was cut into a size of 300×300 mm so that the longitudinal direction and the width direction can be distinguished and humidified in an environment of 20° C. and 40% RH for 48 hours or more. After humidification, it was marked so that the spacing in the width direction was 200 mm (referred to as L0) in an environment of 20° C. and 40% RH to give a test sample. Then, the test sample was humidified in an environment of 20°) C. and 90% RH for 48 hours, to measure the length between marks in the width direction (referred to as L1). The measurement was performed with an accuracy of 0.1 mm. Using the measured value obtained, the moisture absorption elongation was calculated by the following formula.

Moisture absorption elongation (%)=(L1–L0)/L0× 100

(6) Impact resistance of glass laminate

The impact resistance was evaluated using a DuPont impact tester (available from TESTER SANGYO CO., LTD.) according to JIS K 5600-5-3. A chrome steel ball (mass 66.8 g, diameter 25.4 mm) was dropped onto a glass plate surface of a laminate, and the height at which the glass plate constituting the laminate was broken was measured. When the glass plate did not break, the drop starting point of the chrome steel ball was raised, and the test was repeated until the glass plate was broken. The test was performed on each with n number=5, and the height was recorded when breakage was observed in three times out of five times, whereas the height was raised by 5 mm when no breakage was observed in three times out of five times, and the evaluation was continued. Even minor damage such as cracks was judged as broken. The impact resistance was evaluated according to the following criteria. Practically, when the drop height was 500 mm or more, it was evaluated as acceptable, and when the drop height was 560 mm or more, it was evaluated as better.

Good: Drop height was 560 mm or more.
Fair: Drop height was 500 mm or more and less than 560 mm.
Poor: Drop height was less than 500 mm.

(7) Warpage of glass laminate

A laminate bonded with a glass plate was left standing in a room temperature environment (23° C., 50% RH) for 3 minutes immediately after lamination, and then the subsequent state was evaluated according to the following criteria. Good or Fair was considered as acceptable.

Good: No warpage occurred. No lifting was observed at the edges, center, or the like of the laminate.
Warpage occurred. Lifting of 1 mm or more and less. than 2 mm was observed at the edges, center, or the like of the laminate.
Poor: Warpage occurred. Lifting of 2 mm or more was observed at the edges, center, or the like of the laminate. Delamination occurred between the glass plate and the semiaromatic polyamide film.

(8) Appearance evaluation of metal laminate

A laminate bonded with a metal plate was evaluated according to the following criteria. Good or Fair was considered as acceptable.

Good: No delamination was observed at the edges and the center of the laminate. In addition, no appearance abnormality was observed in the laminate at all.
Fair: Delamination was observed at the edges or the center of the laminate.
Poor: Delamination was observed at both the edges and the center of the laminate.

(9) Warpage of metal laminate

A laminate bonded with a metal plate was evaluated according to the following criteria. Good or Fair was considered as acceptable.

Good: No warpage occurred. No lifting was observed at the edges, center, or the like of the laminate.
Fair: Warpage occurred. Lifting of 1 mm or more and less than 2 mm was observed at the edges, center, or the like of the laminate.
Poor: Warpage occurred. Lifting of 2 mm or more was observed at the edges, center, or the like of the laminate. Delamination occurred between the metal plate and the semiaromatic polyamide film.

2. MATERIAL

Using the following raw material, a semiaromatic polyamide film and a laminate were produced.

(1) Semiaromatic polyamide

Semiaromatic polyamides A and B were produced by the methods described in Preparation Examples 1 and 3 below.

(2) Polyamide 6 film

A commercially available nylon film ("Emblem" available from Unitika Ltd. with a thickness of 25 µm) was used (which may hereinafter be abbreviated as PA6).

(3) Polyethylene terephthalate film

A commercially available PET film ("EMBLET" available from Unitika Ltd. with a thickness of 25 µm) was used (which) may hereinafter be abbreviated as PET).

(4) Adhesive layer

Optical adhesive film ("PANACLEAN PS1-15HU75" available from PANAC CO., LTD. with a thickness of 15 µm)

(5) Glass plate

Alkali-free glass substrate ("OA-10G" available from Nippon Electric Glass Co., Ltd. with a thickness of 30 µm)

(6) Metal plate

Electrodeposited copper foil (available from Furukawa Electric Co., Ltd., surface CTS-treated with a thickness of 18 µm)

PREPARATION EXAMPLE 1

(Production of pellets of semiaromatic polyamide A)

3289 parts by mass of terephthalic acid (TPA), 2533 parts by mass of 1,9-nonanediamine (NDA), 633 parts by mass of 2-methyl-1,8-octanediamine (MODA), 48.9 parts by mass of benzoic acid (BA), 6.5 parts by mass of sodium hypophosphite monohydrate (0.1 mass % with respect to the total of the aforementioned four polyamide raw materials), and 2200 parts by mass of distilled water were put into a reaction vessel and purged with nitrogen. The molar ratio of these raw materials (TPA/BA/NDA/MODA) was 99/2/80/20.

The contents of the reaction vessel were stirred at 100° C. for 30 minutes, and then the internal temperature was raised to 210° C. over 2 hours. At this time, the pressure inside the reaction vessel was raised to 2.12 MPa. After continuing the reaction for 1 hour, the temperature was raised to 230° C., and then the temperature was kept at 230° C. for 2 hours, and the reaction was carried out while gradually removing water vapor and maintaining the pressure at 2.12 MPa. Next, the pressure was lowered to 0.98 MPa over 30 minutes, and the reaction was continued for 1 hour to obtain a prepolymer. This was dried at a temperature of 100° C. under reduced pressure for 12 hours and then pulverized to a size of 2 mm or less.

Then, the pulverized prepolymer was solid-phase polymerized for 10 hours at a temperature of 230° C. and a pressure of 13.3 Pa to obtain a polymer. This was supplied to a biaxial extruder, melt-kneaded under conditions of a cylinder temperature of 320° C., extruded, cooled, and cut to produce pellets of the semiaromatic polyamide A.

The semiaromatic polyamide A had an intrinsic viscosity of 1.17 dl/g, a melting point of 302° C., and a glass transition temperature of 125° C.

PREPARATION EXAMPLE 2

(Production of silica-containing master chip)

98 parts by mass of the semiaromatic polyamide A obtained in Preparation Example 1 and 2 parts by mass of silica (SYLYSIA 310P, available from FUJI SILYSTA CHEMICAL LTD. with an average particle size of 2.7 µm) were melt-kneaded, to produce a master chip (M1) containing 2 mass % of silica.

PREPARATION EXAMPLE 3

(Production of pellets of semiaromatic polyamide B)

489 parts by mass of terephthalic acid (TPA), 507 parts by mass of 1,10-decanediamine (DDA), 2.8 parts by mass of benzoic acid (BA), 1.0 part by mass of sodium. hypophosphite monohydrate (0.1 mass % with respect to the total of the three polyamide raw materials), and 1000 parts by mass of distilled water were put into a reaction vessel and purged with nitrogen. The molar ratio of these raw materials (TPA/BA/DDA) was 99/2/100.

The contents of the reaction vessel were stirred at 80° C. for 0.5 hours and heated at 230° C. for 3 hours. After cooling, the reaction product was taken out.

The reaction product was pulverized, heated at 220° C. for 5 hours in a dryer under a nitrogen stream for solid-phase polymerization to obtain a polymer. This was supplied to a biaxial extruder, melt-kneaded under conditions of a cylinder temperature of 320° C., extruded, cooled, and cut to produce pellets of the semiaromatic polyamide B.

The semiaromatic polyamide B had an intrinsic viscosity of 1.24 dl/g, a melting point of 316° C., and a glass transition temperature of 150° C.

PREPARATION EXAMPLE 4

(Production of silica-containing master chip)

98 parts by mass of the semiaromatic polyamide B obtained in Preparation Example 3 and 2 parts by mass of silica (SYLYSIA 310P, available from FUJI SILYSIA CHEMICAL LTD. with an average particle size of 2.7 μm) were melt-kneaded, to produce a master chip (M2) containing 2 mass % of silica.

EXAMPLE 1

(Production of semiaromatic polyamide film)

Semiaromatic polyamide, a heat stabilizer, and a master chip (M1) were mixed so that the heat stabilizer (SUMILIZER GA-80, available from Sumitomo Chemical Company, Limited) was 0.2 parts by mass, and silica was 0.1 parts by mass, with respect to 100 parts by mass of the semiaromatic polyamide A obtained in Preparation Example 1.

This mixture was put into a 65-mm single-screw extruder with cylinder temperatures set to 295° C. (front stage) and 320° C. (middle stage), and 320° C. (rear stage) and melted, extruded from a T die set to 320° C. into a sheet, cooled by electrostatic contact on cooling rolls set to a surface temperature of 40° C., to obtain a substantially non-oriented unstretched sheet with a thickness of 205 μm.

Next, it was biaxially stretched using a flat sequential drawing machine. First, an unstretched film was heated to 130° C. by roll heating or infrared heating and stretched at a stretch ratio of 2.3 times in the machine direction (in the longitudinal direction), to obtain a longitudinally stretched film. Subsequently, while both ends of the longitudinally stretched film were continuously gripped with clips, the film was led to a lateral stretching machine and biaxially stretched successively. Inside the lateral stretching machine, the temperature of the preheating section was 110° C., the temperature of the stretching section was 148° C., and the stretch ratio was 1.8 times. After stretching, a heat setting treatment was performed at 270° C. for 5 seconds in the first half of the heat setting zone, and then at 275° C. for 5 seconds in the latter half of the heat setting zone immediately thereafter, followed by a relaxation treatment at a relaxation rate of 3.0% in the width direction, to obtain a semiaromatic polyamide film with a thickness of 50 μm.

(Production of glass laminate)

The semiaromatic polyamide film obtained and an adhesive layer were each cut into a size of 150×150 mm, and these were stacked together and bonded using a roll laminator (nip pressure: 0.4 MPa, roll speed: 2 m/minute). The adhesive layer bonded with the semiaromatic polyamide film and the glass plate (150×150 mm) were stacked together and bonded using a roll laminator (nip pressure: 0.4 MPa, roll speed: 2 m/minute), to obtain a glass laminate composed in the order of glass plate/adhesive layer/semiaromatic polyamide film.

(Production of metal laminate)

The semiaromatic polyamide film obtained and an adhesive layer were each cut into a size of 150×150 mm, and these were stacked together and bonded using a roll laminator (nip pressure 0.4 MPa, roll speed: 2 m/minute). The adhesive layer bonded with the semiaromatic polyamide film and an electrodeposited copper foil (150×150 mm) were stacked together and pressed with a heat-press machine (230° C., for 15 minutes, 2 MPa), to obtain a metal laminate composed in the order of metal plate/adhesive layer/semiaromatic polyamide film.

EXAMPLES 2 TO 14 AND COMPARATIVE EXAMPLES 1 TO 6

A semiaromatic polyamide film with a thickness of 50 μm, a glass laminate, and a metal laminate were obtained by the same operation as in Example 1 except that the film production conditions were changed as described in Tables.

EXAMPLES 15 TO 17

A semiaromatic polyamide film with a thickness of 50 μm, a glass laminate, and a metal laminate were obtained by the same operation as in Example 1 except that the semiaromatic polyamide films obtained in Examples 2, 5, and 7 were each heated to 250° C. by roll heating, infrared heating, or the like, and annealing was performed for 10 seconds.

EXAMPLE 18

A semiaromatic polyamide film with a thickness of 50 μm was obtained by the same operation as in Example 1 except that the temperature in the first half of the heat setting treatment was changed to 280° C., the heating time was changed to 30 seconds, the temperature in the latter half of the heat setting treatment was changed to 285° C., the heating time was changed to 30 seconds, and the relaxation rate in the width direction was changed to 7%.

A semiaromatic polyamide film with a thickness of 50 μm, a glass laminate, and a metal laminate were obtained by the same operation as in Example 1 except that the semiaromatic polyamide film obtained was heated to 250° C. by roll heating, infrared heating, or the like, and annealing was performed for 10 seconds.

EXAMPLES 19 TO 20

In Example 19, a semiaromatic polyamide film with a thickness of 75μm, a glass laminate, and a metal laminate were obtained by the same operation as in Example 1 except that the thickness of the unstretched film was changed to 480 μm. In Example 20, a semiaromatic polyamide film with a thickness of 125 μm, a glass laminate, and a metal laminate were obtained by the same operation as in Example 1 except that the thickness of the unstretched film was changed to 800 μm.

EXAMPLE 21

After an unstretched film with a thickness of 52 μm was obtained by the same operation as in Example 1, the film was led to a tenter simultaneous biaxial stretching machine, while both ends of the unstretched film were gripped by clips, for simultaneous biaxial stretching. For the stretching conditions, the temperature of the preheating section was 155° C., the temperature of the stretching section was 150° C., and the stretch ratios in the longitudinal direction and in the width direction were 2.3 times and 2.8 times, respectively. After stretching, a heat setting treatment was performed at 270° C. for 5 seconds and at 275° C. for 5 seconds immediately thereafter, followed by a relaxation treatment at a relaxation rate of 3.0% in the width direction, to obtain a semiaromatic polyamide film with a thickness of 8 μm, a glass laminate, and a metal laminate.

EXAMPLES 22 AND 23

In Example 22, a semiaromatic polyamide film with a thickness of 12 μm, a glass laminate, and a metal laminate were obtained by the same operation as in Example 21 except that the thickness of the unstretched film was changed to 77 μm. In Example 23, a semiaromatic polyamide film with a thickness of 25 μm, a glass laminate, and a metal laminate were obtained by the same operation as in Example 21 except that the thickness of the unstretched film was changed to 160 μm.

EXAMPLE 24

A semiaromatic polyamide film with a thickness of 25 μm, a glass laminate, and a metal laminate were obtained by the same operation as in Example 23 except that the semiaromatic polyamide film obtained in Example 23 was heated to 250° C. by roll heating, infrared heating, or the like, and annealing was performed for 10 seconds.

EXAMPLE 25

A semiaromatic polyamide film with a thickness of 50 μm, a glass laminate, and a metal laminate were obtained by the same operation as in Example 21 except that the semiaromatic polyamide B and the master chip (M2) were used, and the thickness of the unstretched film was changed to 320 μm.

COMPARATIVE EXAMPLE 7

The semiaromatic polyamide film obtained in Comparative Example 1 heated to 250° C. by roll heating, infrared heating, or the like, and annealing was performed for 10 seconds.

COMPARATIVE EXAMPLES 8 AND 9

A nylon film (PA6) was used in Comparative Example 8, and a PET film (PET) was used in Comparative Example 9, for evaluation.

Tables 1 to 3 show the production conditions and the properties of the semiaromatic polyamide film and the properties of the glass laminate and the metal laminate, which were obtained in each of Examples and Comparative Examples.

TABLE 1

| | | | | | Example | | | | | | | | | | | |
|---|---|---|---|---|---|---|---|---|---|---|---|---|---|---|---|---|
| | | | | | 1 | 2 | 3 | 4 | 5 | 6 | 7 | 8 | 9 | 10 | 11 | 12 |
| Film production conditions | Types of resin | | | — | A | A | A | A | A | A | A | A | A | A | A | A |
| | Stretching | Method | | — | Sequential | Sequential | Sequential | Sequential | Sequential | Sequential | Sequential | Sequential | Sequential | Sequential | Sequential | Sequential |
| | | Stretching ratio | MD | times | 2.3 | 2.3 | 2.3 | 2.3 | 2.3 | 2.3 | 2.3 | 2.3 | 2.3 | 2.5 | 1.5 | 3.6 |
| | | | TD | | 1.8 | 4.4 | 2.8 | 2.8 | 2.8 | 2.8 | 2.8 | 2.8 | 2.8 | 3 | 2.8 | 2.8 |
| | | | MD × TD | | 4.1 | 10.1 | 6.4 | 6.4 | 6.4 | 6.4 | 6.4 | 6.4 | 6.4 | 7.5 | 4.2 | 10.1 |
| | Heat setting | The first half | Temperature | ° C. | 270 | 270 | 270 | 255 | 280 | 270 | 270 | 270 | 270 | 275 | 270 | 270 |
| | | | Time | s | 5 | 5 | 5 | 5 | 5 | 0.5 | 30 | 5 | 5 | 5 | 5 | 5 |
| | | The latter half | Temperature | ° C. | 275 | 275 | 275 | 265 | 285 | 275 | 275 | 275 | 275 | 280 | 275 | 275 |
| | | | Time | s | 5 | 5 | 5 | 5 | 5 | 0.5 | 30 | 5 | 5 | 5 | 5 | 5 |
| | Relaxation | Relaxation rate | MD | % | 0 | 0 | 0 | 0 | 0 | 0 | 0 | 0 | 0 | 0 | 0 | 0 |
| | | | TD | | 3 | 3 | 3 | 3 | 3 | 3 | 3 | 0 | 7 | 2 | 3 | 3 |
| | Annealing | | Temperature | ° C. | — | — | — | — | — | — | — | — | — | — | — | — |
| | | | Time | s | — | — | — | — | — | — | — | — | — | — | — | — |
| Film properties | Thickness | | | μm | 50 | 50 | 50 | 50 | 50 | 50 | 50 | 50 | 50 | 50 | 50 | 50 |
| | Haze | | | % | 7 | 15 | 7 | 7 | 10 | 7 | 10 | 7 | 7 | 9 | 7 | 15 |
| | Average linear expansion coefficient (TD) (ppm/° C.) | | A (20 to 125° C.) | | -20 | -80 | -25 | -70 | -5 | -65 | -5 | -65 | -10 | -35 | -25 | -25 |
| | | | B (20 to 250° C.) | | -25 | -85 | -30 | -95 | -10 | -90 | -10 | -75 | -15 | -45 | -30 | -30 |
| | Moisture absorption elongation | | TD | % | 0.5 | 0.2 | 0.5 | 0.2 | 0.8 | 0.4 | 0.8 | 0.2 | 0.8 | 0.4 | 0.5 | 0.5 |
| | Impact resistance | Falling ball drop distance | | mm | 610 | 740 | 640 | 730 | 550 | 730 | 520 | 700 | 580 | 655 | 610 | 650 |
| Glass laminate | Evaluation | | | — | Good | Good | Good | Good | Fair | Good | Fair | Good | Good | Good | Good | Good |
| | Warpage | | | — | Good | Fair | Good | Fair | Good | Fair | Good | Fair | Good | Good | Good | Good |
| Metal laminate | Appearance | | | — | Good | Good | Good | Good | Good | Good | Good | Good | Good | Good | Good | Good |
| | Warpage | | | — | Good | Fair | Good | Fair | Good | Fair | Good | Fair | Good | Good | Good | Good |

TABLE 2

| | | | | | Example | | | | | | | | | |
|---|---|---|---|---|---|---|---|---|---|---|---|---|---|---|
| | | | | 13 | 14 | 15 | 16 | 17 | 18 | 19 | 20 | 21 | 22 | 23 | 24 |
| Film production conditions | Type of resin | | — | A | A | A | A | A | A | A | A | A | A | A | A |
| | Stretching | Method | — | Sequential | Sequential | Sequential | Sequential | Sequential | Sequential | Sequential | Sequential | Simultaneous | Simultaneous | Simultaneous | Simultaneous |
| | | Stretching ratio MD | times | 2.3 | 2.3 | 2.3 | 2.3 | 2.3 | 2.3 | 2.3 | 2.3 | 2.3 | 2.3 | 2.3 | 2.3 |
| | | TD | | 3.5 | 2.8 | 4.4 | 2.8 | 2.8 | 2.8 | 2.8 | 2.8 | 2.8 | 2.8 | 2.8 | 2.8 |
| | | MD × TD | | 8.1 | 6.4 | 10.1 | 6.4 | 6.4 | 6.4 | 6.4 | 6.4 | 6.4 | 6.4 | 6.4 | 6.4 |
| | Heat setting | The first half Temperature | °C. | 270 | 270 | 270 | 270 | 270 | 270 | 270 | 270 | 270 | 270 | 270 | 270 |
| | | Time | s | 5 | 5 | 5 | 5 | 30 | 30 | 5 | 5 | 5 | 5 | 5 | 5 |
| | | The latter half Temperature | °C. | 275 | 275 | 275 | 385 | 275 | 285 | 275 | 275 | 275 | 275 | 275 | 275 |
| | | Time | s | 5 | 3 | 5 | 5 | 30 | 30 | 5 | 5 | 5 | 5 | 5 | 5 |
| | Relaxation | Relaxation rate MD | % | 1 | 3 | 0 | 0 | 0 | 0 | 0 | 0 | 0 | 0 | 0 | 0 |
| | | TD | | 8 | 3 | 3 | 3 | 3 | 7 | 3 | 3 | 3 | 3 | 3 | 3 |
| | Annealing | Temperature | °C. | — | — | 250 | 250 | 250 | 250 | — | — | — | — | — | 250 |
| | | Time | s | — | — | 10 | 10 | 10 | 10 | — | — | — | — | — | 10 |
| Film properties | Thickness | | μm | 50 | 50 | 50 | 50 | 50 | 50 | 75 | 125 | 8 | 12 | 25 | 25 |
| | Haze | | % | 7 | 7 | 15 | 10 | 10 | 10 | 9 | 11 | 2 | 4 | 6 | 6 |
| | Average linear expansion coefficient (TD) (ppm/°C.) | A (20 to 125°C.) | | -10 | -25 | -75 | -5 | -5 | -5 | -25 | -25 | -25 | -25 | -25 | -20 |
| | | B (20 to 250°C.) | | -15 | -30 | -80 | -5 | -5 | 5 | -30 | -30 | -30 | -30 | -30 | -25 |
| | Moisture absorption elongation | TD | % | 0.8 | 0.5 | 0.2 | 0.8 | 0.8 | 0.8 | 0.5 | 0.2 | 0.5 | 0.5 | 0.5 | 0.5 |
| Glass laminate | Impact resistance | Falling ball drop distance | mm | 590 | 640 | 730 | 540 | 510 | 510 | 750 | 800 | 510 | 550 | 580 | 560 |
| | Warpage | Evaluation | — | Good | Good | Good | Fair | Fair | Fair | Good | Good | Fair | Fair | Good | Good |
| Metal laminate | Appearance | | — | Good | Good | Fair | Good | Good | Good | Good | Good | Good | Good | Good | Good |
| | Warpage | | — | Good | Good | Fair | Good | Good | Fair | Good | Good | Good | Good | Good | Good |

TABLE 3

| | | | Example | | Comparative Example | | | | | | | |
|---|---|---|---|---|---|---|---|---|---|---|---|---|
| | | | 25 | 1 | 2 | 3 | 4 | 5 | 6 | 7 | 8 | 9 |
| Film production conditions | Types of resin | — | B | A | A | A | A | A | A | A | PA6 | PET |
| | Stretching Method | — | Simultaneous | Sequential | Sequential | Sequential | Sequential | Sequential | Sequential | Sequential | — | — |
| | Stretching ratio MD | times | 2.3 | 2.3 | 2.3 | 2.3 | 2.3 | 2.3 | 2.3 | 2.3 | — | — |
| | TD | times | 2.8 | 2.8 | 2.8 | 2.8 | 2.8 | 3 | 3.5 | 2.8 | — | — |
| | MD × TD | times | 6.4 | 6.4 | 6.4 | 6.4 | 6.4 | 7.5 | 8.1 | 6.4 | — | — |
| | Heat setting The first half Temperature | °C | 270 | 275° C. | 255° C. | 275° C. | 275° C. | 255° C. | 275° C. | 275° C. | — | — |
| | Time | s | 5 | 10 s | 10 s | 60 s | 10 s | 60 s | 10 s | 10 s | — | — |
| | The latter half Temperature | °C | 275 | — | — | — | — | — | — | — | — | — |
| | Time | s | 5 | — | — | — | — | — | — | — | — | — |
| | Relaxation Relaxation rate MD | % | 0 | 0 | 0 | 0 | 0 | 0 | 1 | 0 | — | — |
| | TD | % | 3 | 3 | 3 | 3 | 0 | 3 | 8 | 3 | — | — |
| | Annealing Temperature | °C | — | — | — | — | — | — | — | 250 | — | — |
| | Time | s | — | — | — | — | — | — | — | 10 | — | — |
| Film properties | Thickness | μm | 50 | 50 | 50 | 50 | 50 | 50 | 50 | 50 | 25 | 25 |
| | Haze | % | 13 | 7 | 7 | 9 | 7 | 10 | 7 | 7 | 4 | 4 |
| | Average linear expansion coefficient (TD) (ppm/°C) A (20 to 125° C.) | | 0 | 20 | 10 | 30 | 5 | 10 | 5 | 15 | −120 | −150 |
| | B (20 to 250° C.) | | −5 | 35 | 15 | 45 | 5 | 30 | −15 | 25 | Not measurable | Not measurable |
| | Moisture absorption elongation TD | % | 0.7 | 1 | 0.9 | 1 | 0.6 | 1 | 0.6 | 1 | 1.6 | 0.1 |
| Glass laminate | Impact resistance Falling ball drop distance | mm | 500 | 355 | 355 | 350 | 350 | 350 | 490 | 350 | 355 | 345 |
| | Evaluation | — | Fair | Poor | Poor | Poor | Poor | Poor | Poor | Poor | Poor | Poor |
| | Warpage | — | Good | Good | Good | Good | Good | Good | Good | Good | Poor | Poor |
| Metal laminate | Appearance | — | Good | Poor | Fair | Poor | Fair | Poor | Good | Poor | Poor | Poor |
| | Warpage | — | Good | Fair | Good | Fair | Good | Fair | Good | Fair | Poor | Fair |

Since the semiaromatic polyamide film of each of Examples 1 to 25 had predetermined properties, the impact resistance of the glass laminate was good, and the occurrence of warpage was suppressed. Further, the appearance defects and warpage of the metal laminate were not observed.

The semiaromatic polyamide film of each of Comparative Examples 1 to 7 had an average linear expansion coefficient in the conditions A exceeding the upper limit specified in the present invention (expanded). As a result, the glass laminate had poor impact resistance. In particular, the semiaromatic polyamide film of each of Comparative Examples 1 to 5 and 7 had an average linear expansion coefficient in the conditions B exceeding the upper limit specified in the present invention, and the metal laminate had poor appearance.

The film of each of Comparative Examples 8 and 9 had an average linear expansion coefficient in the conditions A significantly falling below the lower limit specified in the present invention (excessively shrunk). As a result, warpage significantly occurred in the glass laminate.

The film of Comparative Example 8 used a polyamide other than the semiaromatic polyamide, and therefore the average linear expansion coefficient in the conditions B was not measured. Further, the moisture absorption elongation did not satisfy the predetermined range. As a result, warpage occurred in the metal laminate, and the metal laminate had poor appearance.

Since the film of Comparative Example 9 was a resin film different from semiaromatic polyamide, the average linear expansion coefficient in the conditions B was not measured.

REFERENCE EXAMPLE 1

The glass plate alone to be used for the aforementioned laminate was evaluated for impact resistance. The falling ball height upon rupture of the glass plate was 200 mm.

REFERENCE EXAMPLE 2

The glass plate to be used for the aforementioned laminate laminated with only an adhesive layer (OCA) was evaluated for impact resistance. The falling ball height upon rupture of the glass plate was 210 mm.

The invention claimed is:

1. A semiaromatic polyamide film comprising a semiaromatic polyamide of polyamide 9T consisting of 1,9-nonanediamine and/or 2-methyl-1,8-octanediamine, and terephthalic acid, or polyamide 10T consisting of 1,10-decanediamine and terephthalic acid,
   wherein the semiaromatic polyamide film has an average linear expansion coefficient in a width direction, measured under conditions of 20 to 125° C., of −90 to −10 ppm/° C., a moisture absorption elongation in a width direction after 48 hours under conditions of 20° C. and 90% RH of 1.0% or less, and a thickness of 50 μm to 150 μm.

2. The semiaromatic polyamide film according to claim 1, having an average linear expansion coefficient in a width direction, measured under conditions of 20 to 250° C., of −80 to −10 ppm/° C.

3. The semiaromatic polyamide film according to claim 1, having a moisture absorption elongation in a width direction after 48 hours under conditions of 20° C. and 90% RH of 0.5% or less.

4. The semiaromatic polyamide film according to claim 1, having a haze of 10% or less.

5. A laminate comprising:
   the semiaromatic polyamide film according to claim 1; and
   a glass plate.

6. The laminate according to claim 5, having a falling ball (66.8 g) drop distance upon rupture of the glass plate in a DuPont impact test, of 500 mm or more.

7. A laminate comprising:
   the semiaromatic polyamide film according to claim 1; and
   a metal plate.

8. An image display device using the laminate according to claim 5.

9. A method of producing the semiaromatic polyamide film according to claim 1, comprising:
   extruding a semiaromatic polyamide from a T die to form an unstretched film of semiaromatic polyamide, and
   biaxially stretching the unstretched film of semiaromatic polyamide at a temperature of 150° C., and then performing a heat setting treatment,
   wherein the heat setting treatment is performed in a heat setting zone that is divided into two or more regions in a film traveling direction and provided with a gradient in temperature in which the temperature increases in the film traveling direction,
   wherein the heat setting zone has a temperature in a first region of 260° C. to 280° C. and a temperature in a second region of 265° C. to 285° C.

* * * * *